March 10, 1931. R. N. FALGE 1,795,940
TAIL LAMP GLASS
Filed Jan. 17, 1930
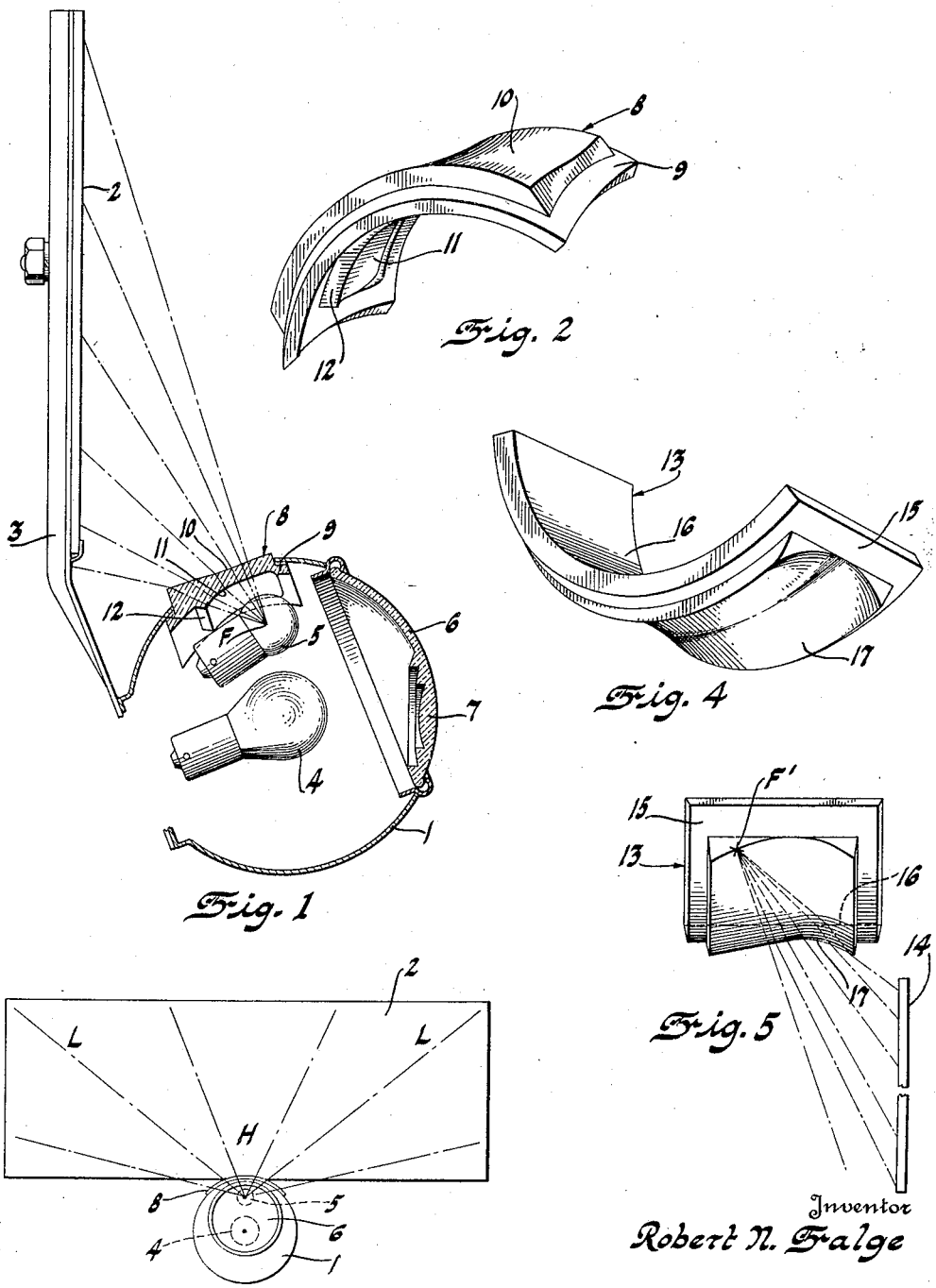
Inventor
Robert N. Falge Patented Mar. 10, 1931

1,795,940

UNITED STATES PATENT OFFICE

ROBERT N. FALGE, OF DETROIT, MICHIGAN, ASSIGNOR TO GENERAL MOTORS RESEARCH CORPORATION, OF DETROIT, MICHIGAN, A CORPORATION OF DELAWARE

TAIL-LAMP GLASS

Application filed January 17, 1930. Serial No. 421,409.

This invention relates to an improved rear lamp structure, and more particularly to the lens therein through which rays from the usual tail lamp pass to illuminate the license plate mounted adjacent to the rear lamp structure. The usual form of rear lamp structure consists essentially of a casing enclosing a lamp and provided with two window openings, one of which is directed to the rear of the vehicle on which the structure is mounted and is closed by a colored lens, generally red, to serve as a tail light, and the other of which is so positioned as to illuminate the usual license plate mounted either above, below or to one side of the casing and is closed by a clear glass lens. Such structures are combined in some instances with signal lamps and lenses.

The clear glass lens is generally curved to fit the particular contour of the type of lamp casing employed and provided with substantially parallel inner and outer surfaces whereby light rays from the lamp pass directly therethrough to illuminate the license plate, the result being that the plate is not properly illuminated in that there is produced a point of highest intensity at that portion of the plate closest to the lamp and points of lowest intensity at the portions of the plate furthest removed from the lamp rendering it difficult, if not impossible, to distinguish all the legends or numbers of the plate at any appreciable distance therefrom. Various changes in the relative locations of the license plate, glass lens and lamp have been attempted to better the light distribution, none of which accomplish the most desirable result of illuminating substantially all portions of the plate uniformly.

The object of the present invention is to provide a more satisfactory illumination of the license plate which is accomplished primarily by the use of a glass lens formed with a transverse curvature on either the inner or outer surface to deflect a portion of the rays which would otherwise be projected directly on the point of highest intensity on the plate to thereby reduce the ratio of illumination between this point and the points of lowest intensity. This results in a more uniform illumination of the entire license plate and has been found to render the legends or numerals thereon more readily legible and distinguishable than in the usual structure wherein there is a point of such high intensity as to cause glare from such point and consequent blurring of the remainder of the plate.

In the practice of my invention, two alternatives are suggested, either the provision of a lens surface having a portion thereof transversely convex, or a lens surface having a portion thereof transversely concave. The use of a convex surface has the advantage that the rays passing normally to the point of highest intensity may be deflected to the points of lowest intensity with the disadvantage, however, that the thickness of the lens is such that the molding thereof on a large scale without material flaws in the glass structure has been found impractical. I prefer, therefore, to form the lens with a transversely concave surface or what might be termed a half-fluted surface, which is so constructed and positioned as to deflect a portion of the rays from the highest intensity point to strike the extreme adjacent edge of the license plate or pass without said edge. Such a structure reduces the ratio heretofore mentioned by reducing the illumination of the point of highest intensity to more nearly conform to the illumination of the points of lowest intensity.

In the drawings forming a part hereof,

Figure 1 is a vertical sectional view of a rear lamp structure with parts omitted, as assembled with a license plate.

Figure 2 is a perspective of the license plate lens of Figure 1.

Figure 3 is a diagrammatic view of a license plate and lamp structure in rear elevation.

Figure 4 is a perspective of a modified form of license plate lens.

Figure 5 is an end elevation of the lens shown in Figure 4 showing diagrammatically the relative position of the lamp filament and license plate.

Referring first to the embodiment illustrated in Figures 1, 2 and 3, the rear lamp structure is mounted in a plane below the license plate, the rear lamp structure being generally designated by the casing 1 below and to the rear of the license plate 2 carried by the supporting bracket 3. This casing 1 encloses the signal lamp 4 and tail lamp 5. The front of the casing or that portion which faces away from the vehicle on which it is mounted toward the rear thereof is provided with an opening closed by a colored lens 6 which functions as a tail light indication as illuminated by lamp 5, and as a stop signal when illuminated by signal lamp 4. The lens 6 is shown as formed with a so-called bull's-eye 7 consisting of special diffusing surfaces to amplify the effectiveness of the lens as a stop signal, it being understood that the signal lamp is suitably connected for operation in conjunction with the braking system.

The top of the casing 1 is provided with a window opening in which is positioned a clear glass lens 8. This lens is adapted to be retained in position within the window opening by any suitable means and is properly located by the provision of the flange portion 9 extending from the lens body portion and contacting with the inside of the casing around the edges of the opening therein. The body portion of the lens or that portion between the flanges extends through the window opening and is provided with an outer surface 10 which is substantially a segment of a cylinder. The inner surface of the lens is substantially cylindrical in longitudinal section but is curved transversely to provide in the lens a half-flute or concave portion 11. It will be noted, on reference to Figure 1, that the curvature of the inner lens surface increases as it approaches the rear edge where it joins with the adjacent flange portion in substantially a prism form 12.

The light rays from the tail lamp 5 pass through the portion 11 of the lens 8 to illuminate the license plate 2, whereas the prism portion 12 is only incidental in that it is provided for the purpose of reducing the thickness of the lens along the rear edge of the opening. By reference to Figure 1, it will be seen that the filament F of the lamp 5 is positioned below and to the right of the center of the lens 8 substantially in vertical alinement with the front edge of the window opening. As is illustrated in Figures 1 and 3, the light rays passing through the concave half-flute portion 11 of the lens 8 are deflected particularly adjacent the left half thereof. By the provision of the half-flute the rays which otherwise would cause a point of highest intensity, as at H, are deflected downwardly toward the bottom edge and below the said edge of the license plate 2, the path of such deflected rays being substantially as illustrated.

The result of the foregoing structure is to reduce the illumination of that portion of the plate adjacent to the tail lamp so as to reduce the ratio of illumination between the point of highest intensity and the points of lowest intensity, which are indicated, respectively, at H and L in Figure 3. By this means, the intensity at H is caused to more nearly approach that at L whereby all portions of the license plate will be illuminated with differences in intensity substantially reduced, noting that the cylindrical contour of the lens provides for illumination of the sides and extreme bottom corners of the license plate.

In the embodiment illustrated in Figures 4 and 5, the lens 13 is adapted to close a window opening in a rear lamp structure of the type in which the window opening is provided in the bottom of the casing for an assembly in which the license plate 14 is positioned below the rear lamp structure. In this form the lens 13 is provided with the positioning flange portion 15 adapted to fit the inside contour of the edges of the window opening. By reason of the location of the lens in the bottom of the lamp casing, it is feasible to simplify the shape of the lens by providing the transverse curvature in the outer projecting surface. The inner surface 16 is substantially a segment of a cylinder co-extensive with the inner surface of the flange portion. The outer surface extends through the window opening between the flange portion and is curved transversely to form a half-flute or concave portion 17.

As is shown in Figure 5 the rays from filament F' in this form are deflected upwardly adjacent the right side of the lens to reduce the illumination at the point of highest intensity. This structure has the additional advantage that it permits a narrowing of the glass fore and aft without difficulty from a shadow in the center of the plate at the top which with an inaccurate bulb might shade the upper part of the center figures at times.

From the foregoing it will be seen that I have designed a lens which provides for a reduction of the differences in degree of illumination of all portions of the license plate over that heretofore attained. The forms of the present lenses were particularly designed for substitution in existing rear lamp structures but obviously the invention is not limited thereto, but is substantially as set forth in the appended claims.

I claim:

1. The combination with a license plate of a lamp structure mounted adjacent thereto, comprising a casing provided with a lamp and a lens through which rays from said lamp pass to illuminate said license plate, in which said lens is formed with a half-flute to deflect some of the light rays from their normal straight path for the purpose of reducing the ratio of illumination between the points of highest and lowest intensity on said license plate.

2. In a rear lamp structure, a casing, a lamp therein, an opening in said casing, and a glass lens closing said opening, said lens being substantially cylindrical longitudinally and one of the surfaces thereof being curved transversely whereby rays from said lamp will be distributed with increased uniformity over the face of a license plate mounted adjacent thereto.

3. In a rear lamp structure, a casing, a lamp therein, an opening in said casing closed by a colored lens illuminated by said lamp to serve as a tail light, and an opening in said casing closed by a glass lens, said lens being formed with a transversely curved surface to deflect a portion of the rays from said lamp passing therethrough to illuminate an adjacent license plate.

4. In a rear lamp structure, a casing, a lamp therein, a window opening in said casing, and a glass lens closing said opening, said lens being longitudinally cylindrical and the inner surface thereof being transversely concave.

5. In a rear lamp structure, a casing, a lamp therein, an opening in said casing and a glass lens provided with flange portions on its ends and sides for positioning said lens in said opening, wherein the transverse sections of said lens intermediate the ends increase in thickness from one side toward the other to form a half-flute adapted to deflect rays from said lamp passing therethrough.

6. In a rear lamp structure, a casing, a lamp therein, an opening in said casing, and a glass lens which in transverse section includes a half-flute and closes said opening.

7. The combination with a license plate, of a lamp structure mounted therebelow comprising a casing provided with a lamp and a lens through which rays from said lamp pass to illuminate said license plate, in which said lens is provided with a curved surface to deflect a portion of said rays downwardly adjacent the bottom of said plate.

8. A lens adapted to close a license plate window opening in a rear lamp structure, comprising longitudinally cylindrical inner and outer surfaces, one of which is substantially flat transversely, and the other of which is curved transversely, as and for the purposes herein described.

In testimony whereof I affix my signature.

ROBERT N. FALGE.